United States Patent
Kuhara et al.

(10) Patent No.: US 6,614,964 B2
(45) Date of Patent: Sep. 2, 2003

(54) OPTICAL COMMUNICATION APPARATUS

(75) Inventors: Yoshiki Kuhara, Osaka (JP); Hiromi Nakanishi, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 199 days.

(21) Appl. No.: 09/768,903

(22) Filed: Jan. 24, 2001

(65) Prior Publication Data
US 2001/0016094 A1 Aug. 23, 2001

(30) Foreign Application Priority Data

Jan. 24, 2000 (JP) ........................ 2000-014358

(51) Int. Cl.[7] .............................. G02B 6/30; G02B 6/36
(52) U.S. Cl. ............................. 385/49; 385/88; 385/89
(58) Field of Search ..................... 385/49, 14, 89–92

(56) References Cited

U.S. PATENT DOCUMENTS 6,027,254 A * 2/2000 Yamada et al. ............... 385/88
2002/0027230 A1 * 3/2002 Terada et al. ................. 257/98

FOREIGN PATENT DOCUMENTS

EP       0 905 536 A2 * 3/1999 ............ G02B/6/42

OTHER PUBLICATIONS

R. Yakahashi et al., "Packaging of optical semiconductor chips for SFF optical transceiver," Institute of Electronics, Information and Communication Engineers, C–3–28, p. 133 (1999).

S. Sasaki et al., "Passive Alignment Technique for LD Module using Si Platform," Technical Report of Institute of Electronics, Information and Communication Engineers, EMD 95–27, CPM95–53, OPE95–50, pp. 19–24 (1995).

H. Kimura et al., "A Low–Crosstalk Optical Module Design on PLC Platform for Realizing LD/PD Full–Duplex Operation in ATM Systems," ECOC'98, 20–24, pp. 481–482Madrid, Spain (Sep. 1998).

T. Ikeuchi et al., "High Sensitivity ATM–PON PLC Transceiver (ONU) by Unique Crosstalk Reduction Method," ECOC'99, 26–30, pp. I–330–I–331, Nic, France (Sep. 1999).

* cited by examiner

Primary Examiner—Rodney Bovernick
Assistant Examiner—Juliana K. Kang
(74) Attorney, Agent, or Firm—Fish & RIchardson P.C.

(57) ABSTRACT

A transmitting and receiving module helps reduce electrical crosstalk and noise during transmitting and/or receiving signals. Electrical isolation among metallized electrodes in a surface-mounted module with an optical fiber and an optical device can be achieved by using a low resistivity Si substrate, providing ground terminals on the surface of the Si substrate, and grounding the Si substrate. Noise and crosstalk during transmitting and receiving signals can be reduced by providing a copper contact adhered to the bottom surface of the Si substrate and by grounding.

17 Claims, 9 Drawing Sheets

EXAMPLE 1

PREVIOUS EXAMPLE

PREVIOUS EXAMPLE 1

Prior Art (a)

Prior Art (b)  Equivalent Electrical Circuit

EXAMPLE 1

PREVIOUS EXAMPLE 2

EXAMPLE 2

PREVIOUS EXAMPLE 3

PREVIOUS EXAMPLE 3

EXAMPLE 3

EXAMPLE 3

OPTICAL COMMUNICATION APPARATUS

BACKGROUND OF THE INVENTION

1. Field of the Invention

This invention relates to an optical communication apparatus such as a transmitter, a receiver and a transmitting-receiving device, and especially a surface-mounted module.

2. Description of Related Art

Modules in practical use for optical transmission at present have a three-dimensional structure with a laser diode (hereinafter referred to as "LD"), a photo diode (hereinafter referred to as "PD"), a lens, and a ferule for supporting an optical fiber end.

FIG. 1 is a cross sectional view of an LD module in practical use. An LD 3 is fixed on a side of a pole 2 equipped near the center of a metallic stem 1, and a monitoring PD 4 is fixed on the center of the metallic stem 1. A cylindrical cap having an opening 5 and a cylindrical lens holder 6 are equipped on a metallic stem 1. A lens 7 is fixed at the opening of the lens holder 6. A conical ferule holder 8 is fixed on the lens holder 6. A ferule 10 for holding a tip of an optical fiber 9 is inserted into the top of the ferule holder 8. Light emitted from the LD 3, perpendicular to the stem surface, is focussed by the lens to enter the optical fiber 9 in the ferule 10.

Since this module is mounted in a metallic package and has many adjusting parts, it is reaching a limit in terms of cost reduction and minimization of the module because of its structure.

Therefore, a surface-mounted optical transmission module was proposed in order to reduce and minimize cost. In the module, a V groove for putting an optical fiber therein was provided on a Silicon (hereinafter referred to as "Si") substrate, and an optical device such as an LD or a PD was mounted on the Si substrate without any adjustments. The Si substrate used in the module differed from Si wafer material used in semiconductor industries.

A proposed configuration of the module is:

a rectangular silicon plate provided as a substrate, an optical fiber end or a ferule having an optical fiber inserted thereinto, which is fixed with adhesives or the like on the substrate, and an optical device such as an LD or a PD provided on the substrate adjacent to the end of the fiber and aligned on the light axis prolongation.

In this module, an Si substrate is used merely as a base plate, and the conductivity of the Si substrate is unnecessary. The conductivity is rather troublesome. A high-resistivity silicon single crystal is used as an Si substrate. After forming an insulation layer, a metallized pattern is formed on the insulation layer. The material of the insulation layer is $SiO_2$ or SiN.

This module is two-dimensional, and the surface of the substrate is parallel to the light direction. An LD or a PD is fixed after being adjusted by the mark provided on the substrate. Optics systems for collecting light such as a lens are omitted because the optical distance between an optical device and an optical fiber end is very short. It was said that the optical fiber and the optical device were securely connected because of adopting a photolithography technology, and this module reduced cost because of the small number of parts. (Reference 1, "Passive Alignment Technique for LD Module using Si Platform", by Mr. Seimi Sasaki et al, EMD 95-27, CPM 95-53, OPE 95-50 (1995-08), Technical Report of The Institute of Electronics, Information and Communication Engineers)

Another type of surface-mounted device combined with a plural number of fibers, optical wave-guides and transmitting and/or receiving optical devices was also proposed. For example, "Research on the mounting method of optical devices for SFF Optical Transceiver", Preprint of the congress, C-3–28 p133, 1999 by Ryu-ta Takahashi, Murakami Kazuya, Sunaga Yoshinori, Tokoro Takehiko and Kobayashi Masahiko in 1999 Congress of the Electronics Society of Electronics and Information Society (Reference 2).

However, there was a problem from the standpoint of electrical crosstalk (hereinafter electrical crosstalk referred to as "crosstalk"). Crosstalk is phenomena in which electric signals for an LD driver go around a substrate and an insulation layer to a PD, when the LD and the PD are placed on the substrate and they transmit and receive signals simultaneously. The lowest crosstalk is the most favorable. To reduce crosstalk, an Si substrate having higher resistivity such as 10 Ωcm to 100 Ωcm was normally used. Furthermore a module using an Si substrate having 1 kΩcm was published. (Reference 3, "A Low-crosstalk Optical Module Design on PLC Platform for Realizing LD/PD Full-duplex Operation in ATM Systems", by Hideki Kimura et al., ECOC 98, Sep. 20–24, 1998, Madrid, Spain) However, it was insufficient for reducing crosstalk.

Another method to reduce crosstalk was proposed by T. Ikeuchi, Y. Tochio, K. Mori, T. Yamamoto, H. Rokugawa, A. Abe, S. Yamada, K. Shimizu and M. Kawai in ECOC'99, Sep. 26–30, 1999, Nice, France. (Reference 4, "High Sensitivity ATMPON PLC Transceiver (ONU) by Unique Crosstalk Reduction Method", Preprint of the congress, p. I-330)

In this reference the authors reported they achieved a removal of crosstalk by passing output signals of the preamplifier (AMP) to a low path filter (LPF) at 155 MHz. However, this method of adding parts such as LPF is not the best solution in terms of cost, which is the most important factor in this Planar Lightwave Circuit (PLC) technology field.

Moreover, the crosstalk reduction method was incomplete. This method is able to prevent high frequency crosstalk, however, crosstalk signals leaking from LD not only have high frequency noise but also low frequency LD noise.

SUMMARY OF THE INVENTION

The present invention is related to a module characterized in that an electrical potential level of a Si substrate is close to the conductor level and the Si substrate is firmly connected to the ground potential level.

It is impossible for a high-resistivity Si substrate to be a good ground, even if the Si substrate is partly grounded. By the present invention, a low resistivity Si substrate becomes an effective ground even if only a part of the Si substrate is grounded.

Crosstalk between an LD and a PD is prevented because there is a ground level surface nearest under the bottoms of electrode patterns for an LD and a PD. A transmission device, which is strong against outer noise and internal crosstalk, can be achieved by grounding the Si substrate. Moreover, the crosstalk is completely removed by providing patterned ground terminals (hereinafter patterned ground terminal(s) referred to as "ground terminal(s)") among electrodes on the surface of the Si substrate.

Additionally, the Si substrate of the present invention is advantageous in the view of obtainability and cost reduction.

A high-resistivity Si single crystal is special. The crystal has a small market and there is no mass production of the crystal. Therefore, it is difficult to obtain, and it is expensive. On the other hand, a low resistivity Si substrate applied to the present invention is made of an ordinary n-type Si single crystal most frequently used in the Si semiconductor industry. Therefore, the low resistivity Si substrate is less expensive, and consequently a device cost can be reduced.

Thus, the resistivity of the Si substrate in the present invention is positively lowered, and the substrate is used as a ground plate. Ground terminals are provided among electrode patterns for optical devices. More preferably a copper contact adhered to the bottom surface of the Si substrate is connected to the ground terminals.

Features that may be present in some implementations of the present invention are summarized as follows:

1. A low-resistivity Si-single crystal is used as an Si substrate.
2. Electrical potential of the Si substrate is a ground potential level.
3. A metallic contact such as a copper contact is adhered to a bottom surface of the Si-substrate.
4. Ground terminals are provided on the Si substrate to prevent electrical connection between each of the electrodes for optical devices.

It was presumed in the past that the higher resistivity of an Si substrate the better. To the contrary, however, the inventors discovered, as described above, that the lower the resistivity of an Si substrate the better. The high-resistivity Si substrate is expensive because of difficulties of production and small markets. On the other hand, the low-resistivity Si substrate can achieve a cost reduction because of easily obtainable mass-manufactured products in the semi-conductor industry.

Moreover, the present invention positively uses an Si substrate as a ground with introducing new concepts of a comb-tooth-shaped grounding structure placed among the electrode patterns for optical devices. The internal crosstalk between an LD and a PD during transmitting and receiving signals can be restrained, and also the PD can be protected from an external noise because of the combination of the low-resistivity Si substrate and the metallized grounding terminals surrounding the electrode patterns. As a resultant a low cost and high performance optical transmission apparatus can be achieved.

PREFERRED EMBODIMENTS OF THE INVENTION

Hereinafter, preferred embodiments of the invention are described in detail with EXAMPLEs, along with PREVIOUS EXAMPLEs according to conventional technologies.

1. First Embodiment

PREVIOUS EXAMPLE 1

Figure 1:
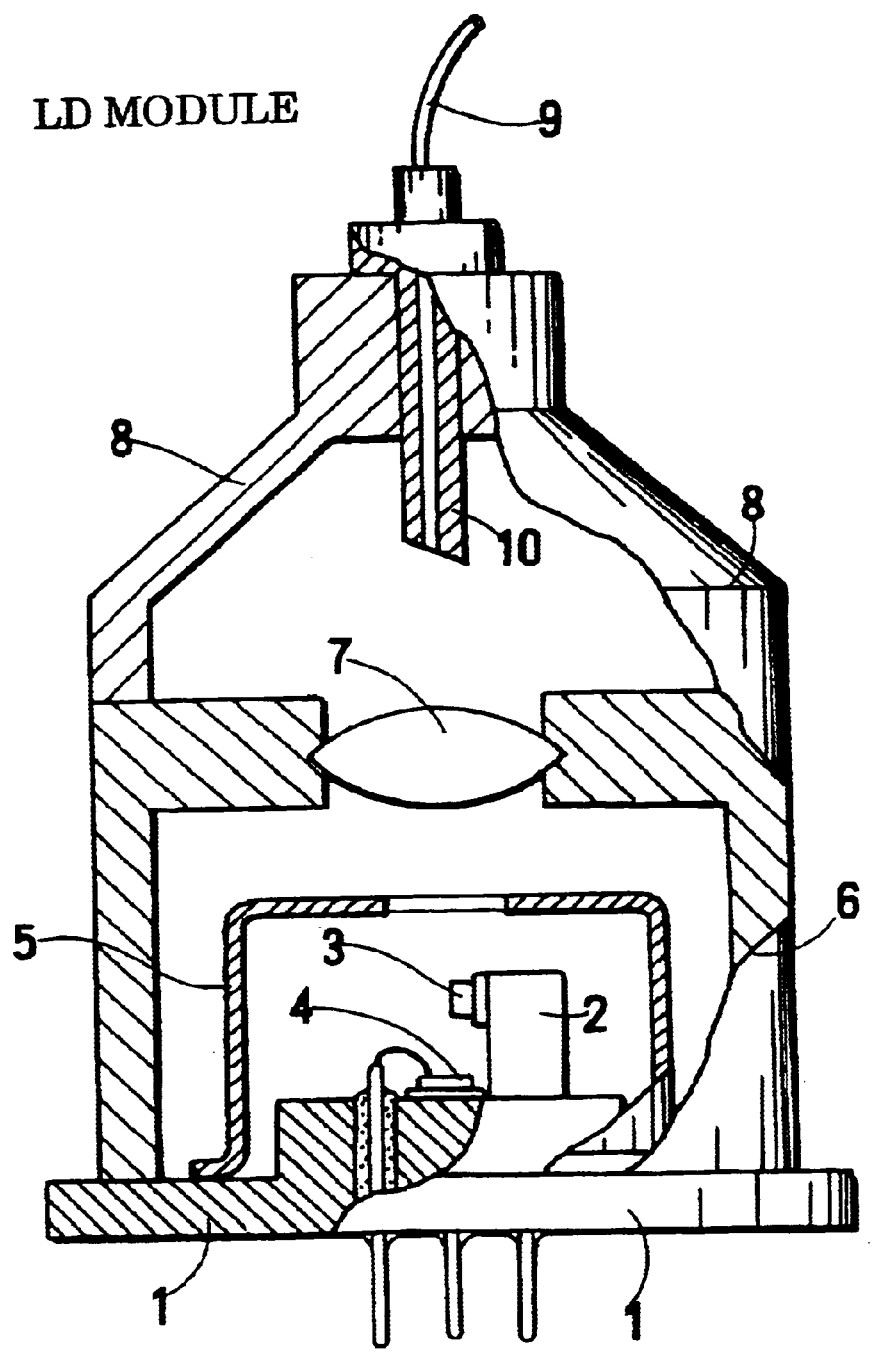
FIG. 1 is a longitudinal cross-sectional view of a three-dimensional-type semiconductor LD module.
Figure 2:
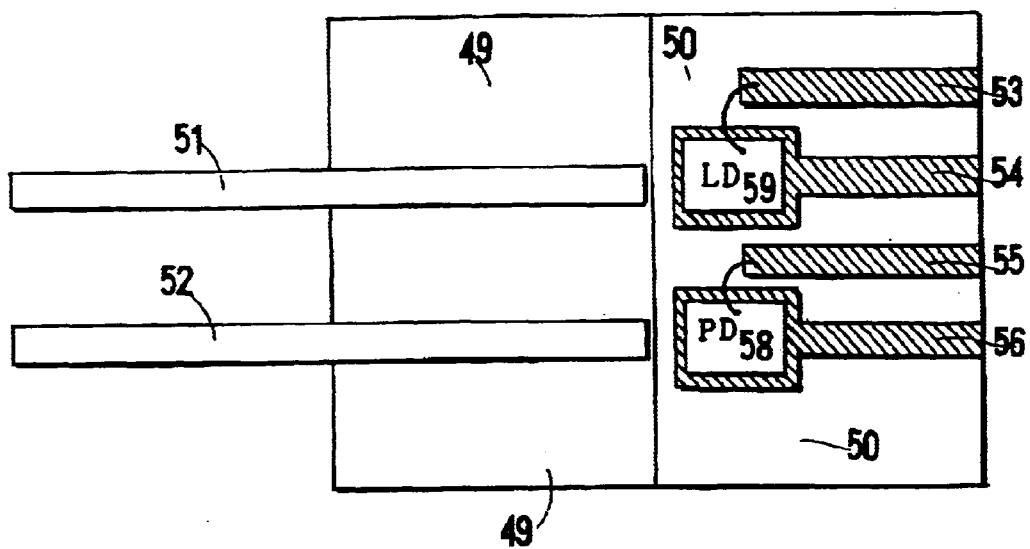
FIG. 2 is a planar view of a PREVIOUS EXAMPLE of a surface-mounted module with dual optical fibers.

FIG. 2 is a PREVIOUS EXAMPLE described in Reference 1. This PREVIOUS EXAMPLE is a surface-mounted module for transmitting and receiving optical signals using dual optical fibers on the module. Referring to FIG. 2, an insulation layer 50 made of $SiO_2$ is provided on at least a part of the surface of an Si substrate 49. Electrode patterns for optical devices are formed on the insulation layer by a metallizing method such as Physical Vapor Deposition (PVD) or printing. Hereinafter electrode pattern(s) for optical devices provided on an insulation layer on the surface of an Si substrate is referred to as "electrode pattern(s)". The insulation layer 50 is necessary because of mutual insulation between electrode patterns. Structures having a plurality of optical fibers and optical devices are optional. For example, optical fibers 51 and 52 are placed on V grooves (not illustrated) carved on the surface of the Si substrate 49. Or instead, optical wave-guides are provided on the surface of the Si substrate to connect with the optical fibers 51 and 52 at the end of the Si substrate. Thus, the fibers are replaceable with optical wave-guides, although FIG. 2 shows the case of optical fibers. An Si substrate is preferably used for surface-mounted modules, because the Si substrate is easily processed to have precise V grooves or optical wave-guides on its surface by photolithography technologies or mechanical processing.

Figure 3:
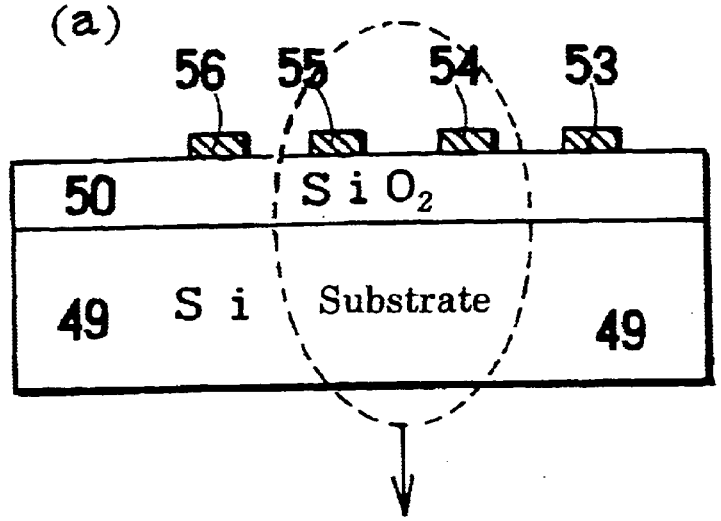
FIG. 3(a) is a longitudinal cross-sectional view at the right edge of FIG. 2.
FIG. 3(b) is an equivalent electrical circuit in the dotted area of FIG. 3(a).
Figure 3:
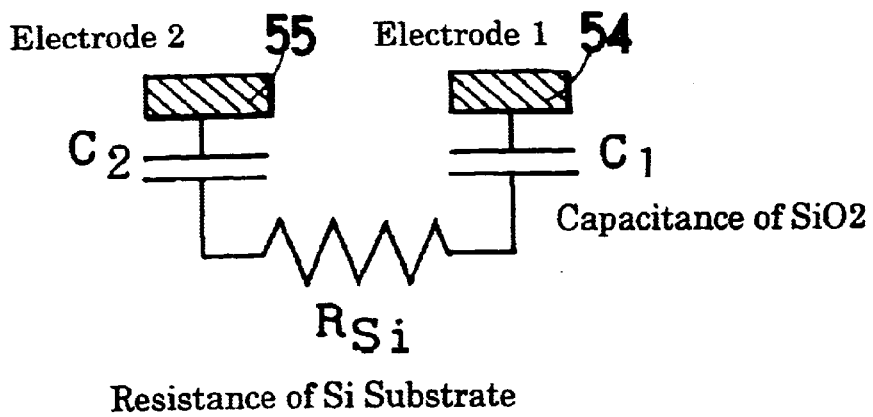

Electrode patterns 53, 54, 55 and 56 are provided on the insulation layer 50 in a parallel direction with the optical fibers 51 and 52. Each of the electrode patterns 54 and 56 has a wide pad, and a LD 59 and a PD 58 are mounted on the pad. Upper electrodes of the LD and the PD are connected with the electrode patterns 53 and 55 respectively by wires. FIG. 3 is a longitudinal cross-sectional view at the right edge of FIG. 2. The $SiO_2$ layer 50 as an insulation layer is provided on the Si substrate 49, and the electrode patterns 53 to 56 are provided on the insulation layer.

The disadvantages of this PREVIOUS EXAMPLE are described below. An Si substrate having higher-resistivity such as 10 Ωcm to 100 Ωcm is generally used in the module. The reason is that a higher-resistivity Si substrate prevents the electric current leakage among two electrode patterns.

However, the highest-resistivity Si substrate is still conductive and an electric current flows through the Si substrate. Consequently, this PREVIOUS EXAMPLE cannot reduce crosstalk sufficiently.

The inventors consider further causes. In this PREVIOUS EXAMPLE, an equivalent electrical circuit of the part marked with the dotted line in FIG. 3(a) becomes as shown in FIG. 3(b). An insulation layer is described as capacitance C1 and C2, and the Si substrate 49 is described as a resistance $R_{S1}$. The electrode patterns 54 and 55 are connected with C1, $R_{Si}$ and C2. Neighboring electrode patterns are electrically connected with these capacitors and a resistor.

Supposing an Si substrate has high-resistivity, such as 10 Ωcm, a distance between the electrode patterns 54 and 55 is 2 mm, a thickness of the Si substrate is 1 mm and a paralleled length of the electrode pattern 54 or 55 is 3 mm, resistance of the Si substrate between the electrode patterns 54 and 55, $R_{Si}$, is roughly calculated as shown in Equation (1).

$$R_{Si}=10\ \Omega cm \times 0.2\ cm/(0.1\ cm \times 0.3\ cm)=\text{about } 70\ \Omega \qquad (1)$$

Exact calculation of resistance must be done between parallel electrodes mounted on the surface of an Si substrate such as the above case to integrate various paths rather than the above-described simple calculation of the resistance of a rectangular body. However, since the order of resistance is necessary in this case, the resistance between the electrodes is calculated under the assumption that the resistance between the electrodes is the same resistance as a rectangular body.

The calculated result includes errors, but it is not a serious problem because the errors occur at a common rate to both PREVIOUS EXAMPLEs and the EXAMPLEs such that they can be neglected when comparing them.

Even though $SiO_2$ has some amount of the capacitance as C1 or C2, high frequency signals pass through the $SiO_2$ layer and then a PD is electrically connected with an LD through the Si substrate at 70 Ω.

A characteristic impedance of normal high-speed electronic circuits for the optical communication apparatus in the field of the present invention is about 50 Ω.

It appears that crosstalk occurs because the resistance of about 70 Ω between the electrode patterns is nearly the same as the characteristic impedance of 50 Ω of the optical communication apparatus.

EXAMPLE 1

Figure 4:
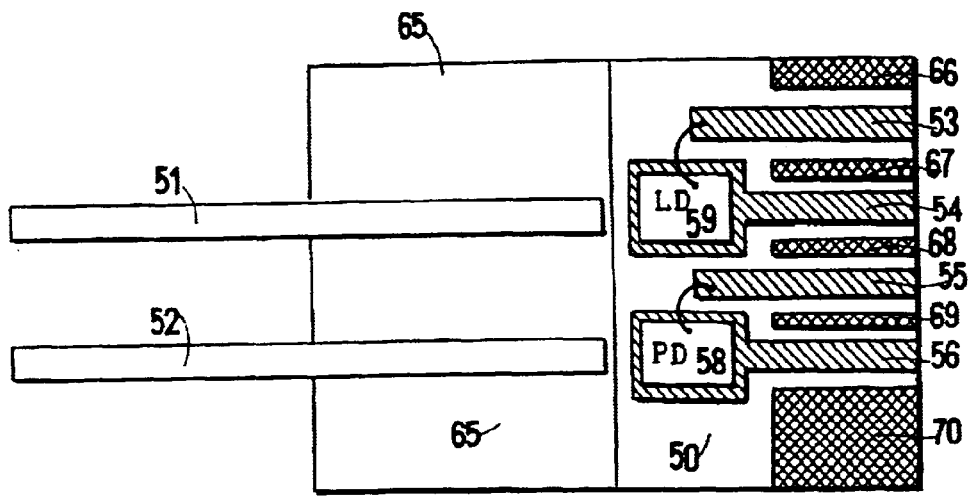
FIG. 4 is a planar view of an EXAMPLE of a surface-mounted module with dual optical fibers.
Figure 5:
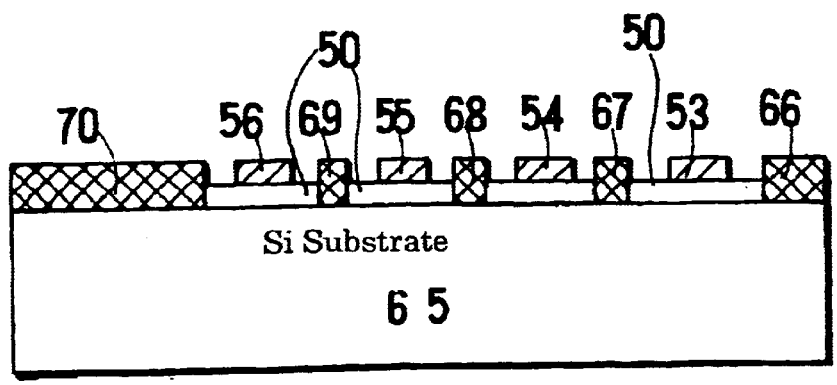
FIG. 5 is a longitudinal cross-sectional view at the right edge of FIG. 4.

FIG. 4 shows a surface-mounted module according to EXAMPLE 1 of the present invention to improve the design of PREVIOUS EXAMPLE 1. FIG. 5 is a cross-sectional view at the right edge of FIG. 4.

The first differing point of FIG. 4 of EXAMPLE 1 compared with FIG. 2 of PREVIOUS EXAMPLE 1 is that a Si substrate 65 is a low-resistivity substrate.

The second different point is that comb-tooth-shaped terminals 66, 67, 68, 69 and 70 are not metallized on an insulation layer of the surface of the Si substrate 65, but directly on an uninsulated surface of the Si substrate by the same metallizing method such as PVD or printing methods. These terminals 66 to 70 are used as ground terminals. Hereinafter metallized terminal(s) for grounding is referred to as "ground terminal(s)". The heights of electrode patterns are different from the heights of ground terminals.

The electrode patterns are provided on the $SiO_2$ insulation layer 50, and ground terminals are formed on an uninsulated surface of the Si substrate 65.

Electrode patterns and ground terminals with different heights are alternately provided. The electrode patterns are separated by the ground terminals. FIG. 5 is a cross-sectional view for clear understanding.

Characteristics related to crosstalk in EXAMPLE 1 are estimated as follows.

An Si substrate has a 10 mm×15 mm of surface size and a 1 mm thickness. Resistivity of the Si-substrate is 0.1 Ωcm.

Isolation among the electrode patterns 53, 54, 55 and 56 for an LD and a PD can be achieved by ground terminals, especially in a comb-tooth shape of the ground terminals 66, 67, 68, 69 and 70 as shown in FIGS. 4 and 5, provided on the low-resistivity Si substrate 65.

Inserting 0.1 Ωcm of resistivity of the Si substrate, about 2 mm of a distance between the metallized electrode pattern of the optical device and the ground metallized pattern, and 3 mm of the length of the parallel portion of the above electrode patterns to Equation (1), the resistance between the electrode pattern for optical device and the ground terminals is calculated roughly at 0.7 Ω (0.1 Ωcm×0.2 cm/(0.3 cm×0.1 cm)). Maximum resistance is estimated at 1 Ω. The result shows that a low-resistivity Si substrate becomes an adequate ground.

If the resistivity of a Si substrate is 1 Ωcm, the resistance between the ground terminal and the Si-substrate nearest beneath the electrode for a device is about 10 Ω. This is the usable upper limit compared with a characteristic impedance, 50 Ω.

Therefore, the upper limit of the resistivity of an Si substrate for this surface-mounted device is 1 Ωcm.

In this EXAMPLE, if one of the comb-tooth-shaped ground terminals 66, 67, 68, 69 and 70, for example the ground terminal 70, is grounded by connecting with a grounding terminal of a lead frame, any other ground terminals are grounded through the Si substrate. The resistivity of an Si substrate being about 1 Ω is enough for this purpose. As above mentioned, in case of the resistivity of the Si substrate being 10 Ω, all of the comb-tooth-shaped ground terminals 66 to 70 must be preferably connected to grounding wires.

By providing ground terminals surrounding electrode patterns on the low-resistivity Si substrate, crosstalk reduction is substantially improved.

In this invention, crosstalk during transmitting and receiving is decreased because of grounding a conductive Si substrate. In case of using a high-resistivity Si substrate, electrode patterns are insufficiently grounded because an electrical field forms inside the Si substrate.

That is, if the conductivity of a Si substrate is 100 Ωcm, the resistance between ground terminals and the Si substrate nearest beneath the electrode of the devices becomes 1 kΩ, which is higher than the characteristic impedance, 50 Ω. This Si substrate is not an adequate ground. It becomes a ground with fluctuating potential.

PREVIOUS EXAMPLE 2

Figure 6:
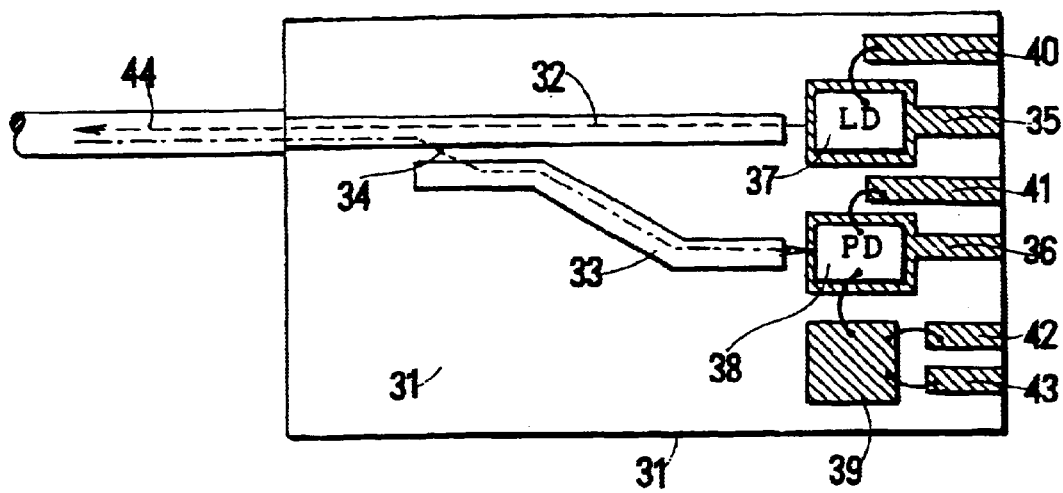
FIG. 6 is a PREVIOUS EXAMPLE of a planar view of a surface-mounted module with Y-branched optical wave-guides.

PREVIOUS EXAMPLE 2, which is basically the same as PREVIOUS EXAMPLE 1, is a Y-branched wave-guide type surface-mounted module proposed in Reference 2, and is shown in FIG. 6.

It is a combined device having both functions of transmitting and receiving in a module. Transmitting a light having a 1.3 μm wavelength and receiving a light having a 1.55 μm wavelength pass through a single optical fiber, and these lights are divided by a Y-branched wave-guide with selecting wavelengths.

Optical wave-guides 32 and 33 are formed on a Si substrate 31 by providing a Ge-doped high-reflective layer on a portion of an SiO$_2$ layer. The high-reflective layer is formed by doping impurities such as Germanium (hereinafter Germanium is referred to as "Ge") for a high-reflective layer into an SiO$_2$ layer provided on the Si substrate.

The Ge-doped high-reflective layer is a core portion covered by the transparent SiO$_2$ layer. The surface of the Si substrate is flat and has no V groove.

A Mach-Zehnder-type optical coupler 34, which is an Interference Refractometer, is provided in the optical wave-guide so as to have a function of selecting a 1.3 μm optical wavelength and 1.55 μm optical wavelength from a combined optical wavelength of transmitted light.

Transmitted light having a 1.3 μm optical wavelength emitted from a LD 37 passes straight inside the optical wave-guide 32, and the light enters into an optical fiber 44.

On the other hand the receiving light having a 1.55 μm optical wavelength that has passed through the optical fiber 44 is lead by the optical coupler to the wave-guide 33, and enters the PD 38.

Electrode patterns 40, 41, 42 and 43 are provided near the LD, PD and/or AMP to connect the respective electrodes.

The surface of the Si substrate is insulated with a uniformly formed SiO$_2$ layer. Electrode patterns 35 and 36 are formed on the upper surface of the insulation layer at an end of the wave-guide by a metallizing method such as printing, and the electrode patterns are wire-bonded with the LD 37 and an PD 38. An amplifier, AMP 39, is mounted on the surface of the Si substrate nearby the PD 38. The AMP amplifies the photocurrent of the PD 38. The Electrode patterns 40, 41, 42 and 43 are formed on the surface of the SiO$_2$ insulation layer on the Si-substrate 31. Upper electrodes of the LD, PD and AMP are electrically connected with electrode patterns by wires.

The optical wave-guides 32 and 33 divide signals by the Y-branch 34. A starting end of the optical wave-guide 32 is connected to the optical fiber 44. A transmission light emits from the LD 37 to the optical fiber 44 through the optical wave-guide 32. A receiving light transmitted from the optical fiber 44 enters into the PD 38 through the optical wave-guides 32, 33 and 34.

The direction of the transmitting light and the surface of an Si substrate is parallel, and the device structure is simple two-dimensional. Fixing of an LD and a PD to the substrate are adjusted by a mark provided on the substrate. The Si substrate is normally used as a high-resistivity Si, which is not popularly used in the Si semiconductor industries.

EXAMPLE 2

Figure 7:
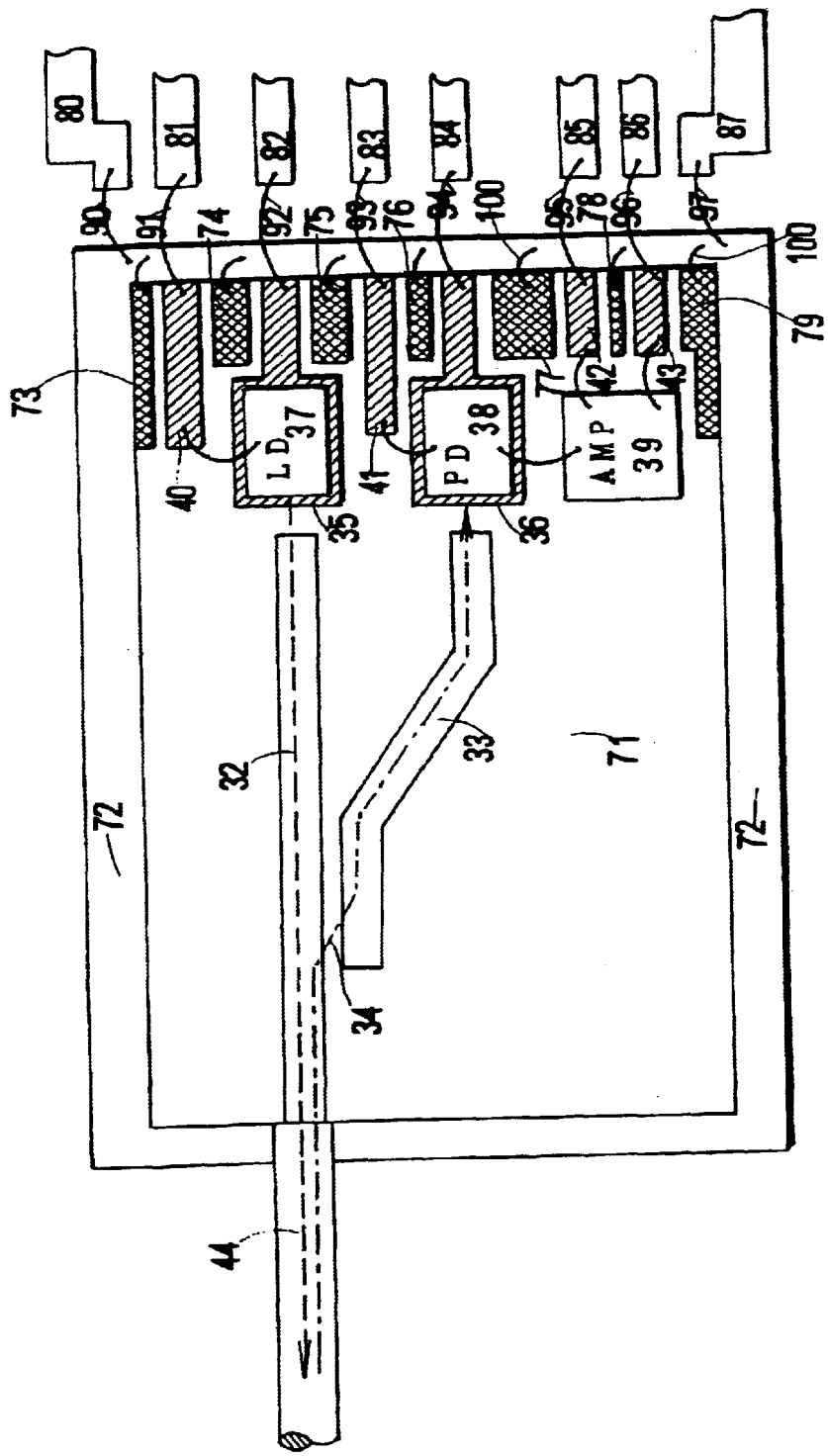
FIG. 7 is an EXAMPLE of a planar view of a surface-mounted module with Y-branched optical wave-guides.

The second example of the present invention of the first embodiment is shown in FIG. 7. EXAMPLE 2 is an improved example of PREVIOUS EXAMPLE 2 by applying the present invention.

In this type of module, the electrical crosstalk which is caused by its own LD 37 drive-signals sneaking round to the PD 38 or AMP 39 of the receiving circuits must be reduced to an extremely low level because the module is used to transmit and receive signals simultaneously. Therefore, a low resistivity Si substrate is grounded together with a grounding copper contact adhered to the bottom surface of the Si-substrate to strengthen the grounding function.

FIG. 7 differs from FIG. 6 as follows.

The first point is to use low resistivity Si substrate 71.

The second point is that ground terminals 73, 74, 75, 76, 77, 78 and 79 are provided directly on the Si substrate as opposed to on an SiO$_2$ layer so as to cut into electrode patterns for optical devices. An illustration of a cross-sectional view of the metallized patterns is omitted because it is the same as FIG. 5. One or more ground terminals directly formed on the Si substrate are connected with one or more grounding terminals of a the lead frame provided for a module.

The third point is that, preferably, a copper contact adhered to the bottom surface of the Si substrate is provided as a ground. This EXAMPLE has a more preferable ground, because a copper contact has lower resistivity (higher conductivity) than the resistivity of an Si substrate. It becomes a reliable ground at higher frequency.

A forming process of EXAMPLE 2, referring to main differences from PREVIOUS EXAMPLE 2, is described below:

Shape of an optical wave-guide is the same as PREVIOUS EXAMPLE 2.

First, an SiO$_2$ under-clad layer having a 15 μm thickness is formed on an Si substrate having resistivity of 0.1 Ωcm and a thickness of 1 mm by the flame deposition method.

Ge is doped into the SiO$_2$ layer, and then the layer is partially etched to form an optical wave-guide.

Upper clad layer is formed on the partially Ge-doped SiO$_2$ layer by the flame deposition method. A wave-guide is surrounded by upper-, lower-, left- and right side clad layers. The cross sectional dimensions of the optical wave-guide are 6 μm×6 μm.

In the path of the optical wave-guide, the Mach-Zehnder-type optical coupler 34 is provided so as to select a 1.3 μm optical wavelength light and a 1.55 μm optical wavelength light.

The LD 37 is a 1.3 μm-FP-LD made of InGaAsP, and the PD 38 is an InGaAs-pin-PD.

The AMP 39 made of GaAs-IC, which is not provided in PREVIOUS EXAMPLE 2, is provided for amplifying receiving signals of the PD 38 at the nearest position of the PD as usually provided in such case.

The ground terminals 73, 74, 75, 76, 77, 78 and 79, which are gold plated comb-tooth-shaped electrodes, are formed after exposing a part of the Si substrate surface covered with the SiO$_2$ clad layer. The size of the Si substrate is 15 mm×10 mm×1.0 mm.

Leads 81 and 82 of a lead frame are connected to the electrode patterns 40 and 35 for the LD with wires 91 and 92. Leads 83 and 84 of a lead frame are connected through wires 93 and 94 to electrode patterns 41 and 36. Leads 85 and 86 of a lead frame are connected to the electrode patterns 42 and 43 for the AMP with wires 95 and 96. These are connections between the electrode patterns for the devices and the lead frame.

Connection of grounding systems is described below:

Entire surface of the Si substrate is an adhered copper contact 72 having 1 mm thickness with conductive resin. Because the resistivity of the copper contact 72 is very low, the copper contact becomes a good ground. Therefore, grounding the Si substrate with the copper contact by connecting ground leads 80 and 87 of a lead frame and the copper contact with gold wires 90 and 97 is more firm than grounding with the comb-tooth-shaped ground terminals 73 to 79. Each of these ground terminals is respectively connected to the copper contact 72 with wires 100.

Evaluation of EXAMPLE 2 is described below comparing with PREVIOUS EXAMPLE 2.

Figure 8:
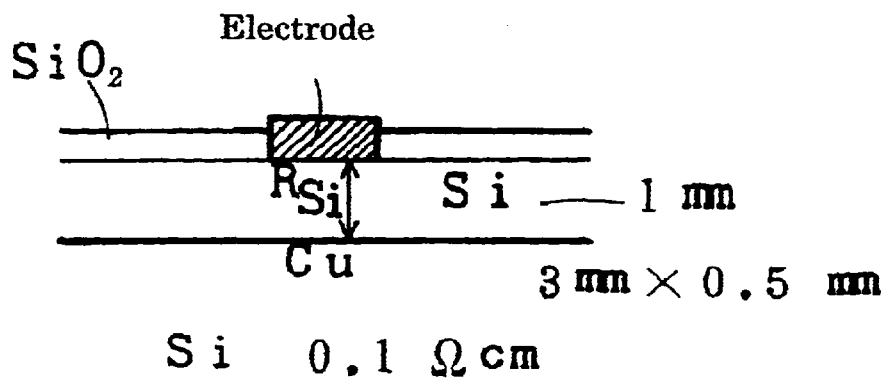
FIG. 8 is an explanatory drawing to calculate the resistance between an electrode provided on a Si substrate and a copper contact adhered to a bottom surface of the Si-substrate.

FIG. 8 is a schematic drawing of EXAMPLE 2 for the evaluation of resistance. Inserting the following data such as 0.1 Ωcm resistivity and 1 mm thickness of an Si substrate, and 0.5 mm width and 3 mm length of electrode patterns in EXAMPLE 2 to Equation (1), resistance between electrode patterns and a copper contact are calculated below:

$$0.1\ cm \times 0.1\ cm / 0.3\ cm \times 0.05\ cm = \text{about } 0.7\ \Omega.$$

Isolation is achieved by adopting such low resistivity Si substrate. Moreover, by connecting each of the ground terminals with the lead frame, crosstalk at 100 MHz during transmitting and receiving signals was evaluated. Crosstalk has been improved by 20 dB (1:0.01) compared with PREVIOUS EXAMPLE 2 whose Si substrate has 10 Ωcm resistivity without providing ground terminals. That is because the isolation among each of the electrode terminals cannot be achieved in PREVIOUS EXAMPLE 2 which used the same high-resistivity Si substrate as PREVIOUS EXAMPLE 1 and no electrode terminals.

2. Second Embodiment

Effects of the present invention were described from the standpoint of crosstalk in the above description. However, other effects of the low resistivity Si substrate and ground terminals on the surface of the Si substrate in a single function surface-mounted module are examined and described below.

PREVIOUS EXAMPLE 3

Figure 9:
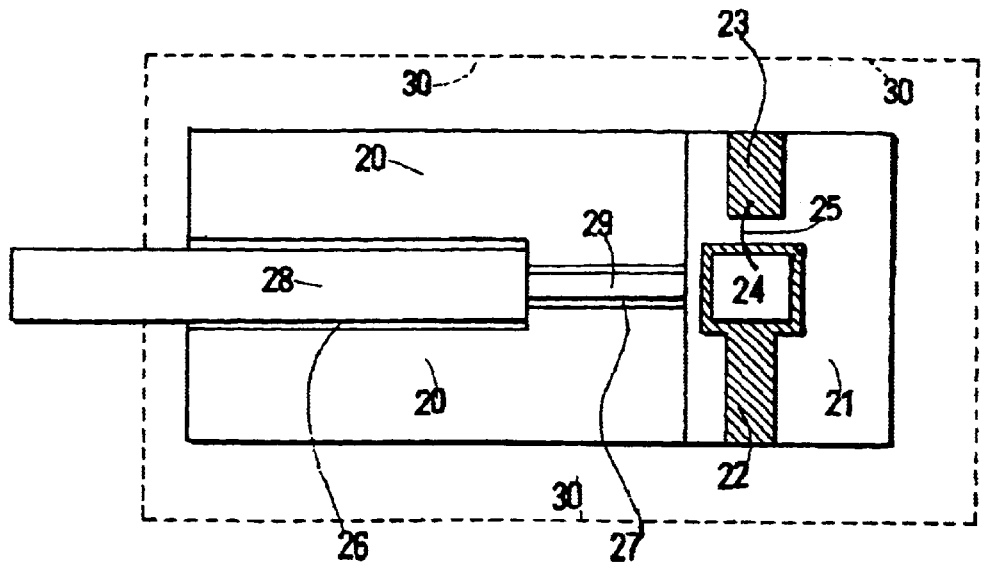
FIG. 9 is a planar view of a PREVIOUS EXAMPLE of a single functioned surface-mounted module.
Figure 10:
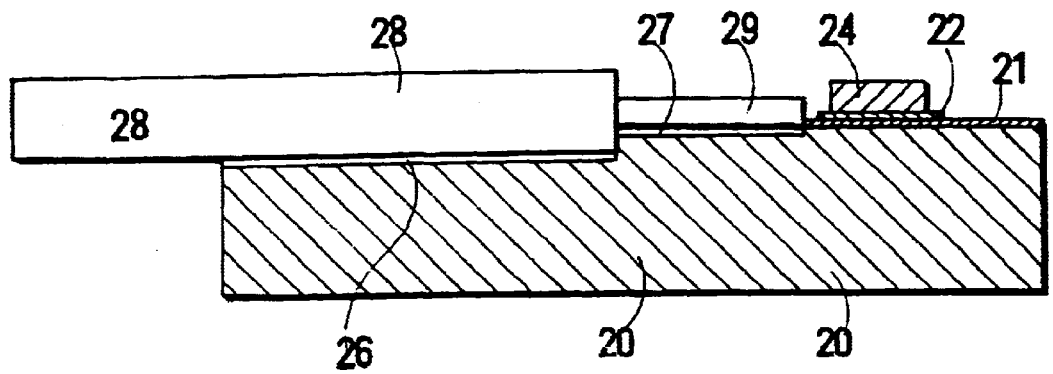
FIG. 10 is a longitudinal cross-sectional view on the light axis line of FIG. 9.

FIG. 9 shows a single function surface-mounted module proposed in Reference 3. FIG. 10 is a longitudinal cross sectional view of FIG. 9 on the light-axis line.

$SiO_2$ insulation layer 21 is provided in the right part of the surface of rectangular Si substrate 20 and electrode patterns 22 and 23 are formed by a metallizing method such as printing on the $SiO_2$ insulation layer 21 as shown in FIG. 10. An optical device 24 such as a PD or an LD is mounted on the electrode pattern 22. The electrode pattern for the optical device 24 is connected to the electrode pattern 23 with wire 25.

At the center of the surface of the Si substrate 20, large V groove 26 and small V groove 27 are provided. The two grooves can be formed by anisotropy etching with photolithography technologies or mechanical processing and so on. Optical fiber 29 is inserted through and fixed with ferule 28, after which the ferule 28 and the optical fiber 29 are respectively placed on the large groove 26 and the small groove 27 and fixed with adhesives. The entire Si substrate 20, ferule 28 and optical fiber 29 are housed in mount 30.

Si substrate is normally used as a high resistivity Si single crystal. After forming the insulation layer 21, electrode patterns are formed on the insulation layer 21. The insulation layer is $SiO_2$ or SiN.

The sizes of the Si substrate, for example, are an area of 15 mm×10 mm and a thickness of 1 mm.

EXAMPLE 3

In the present invention, a low resistivity Si substrate is used and grounded, and a ground terminal is provided on the surface of the Si substrate in EXAMPLE 3.

Figure 11:
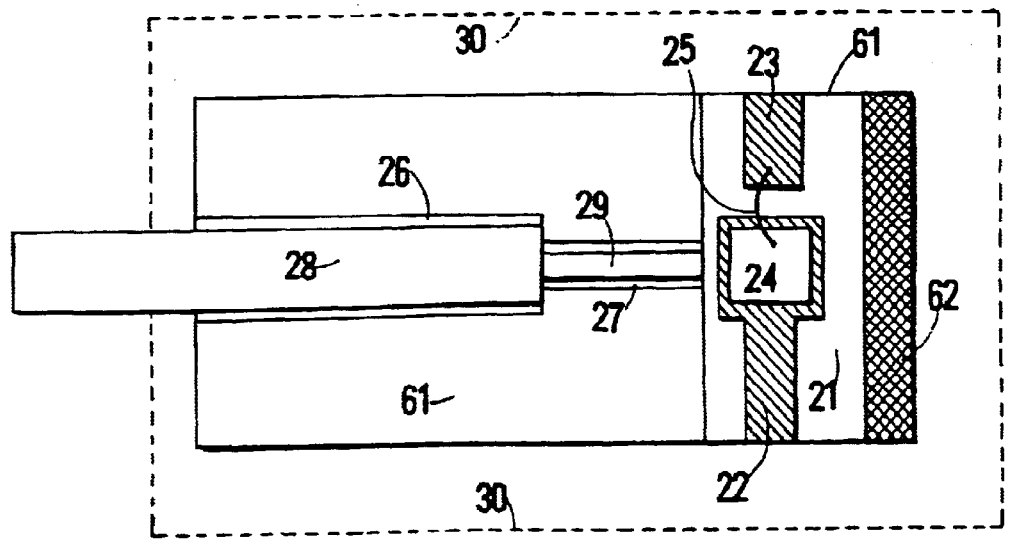
FIG. 11 is a planar view of an EXAMPLE of a single functioned surface-mounted module.
Figure 12:
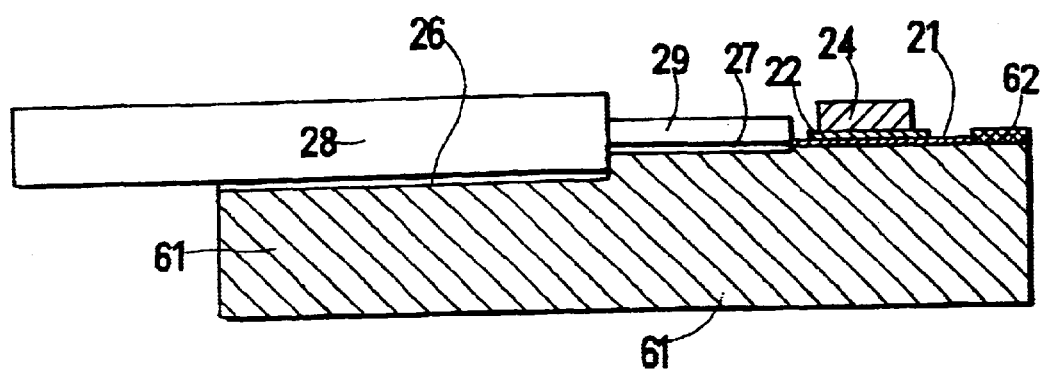
FIG. 12 is a longitudinal cross-sectional view on the light axis line of FIG. 11.

FIGS. 11 and 12 are an improved example of FIGS. 9 and 10 according to the present invention. FIGS. 11 and 12 differ from FIGS. 9 and 10 as follows:

1. The resistivity of Si substrate 61 is as low as 0.1 Ωcm.

2. A metallized area is formed on an uninsulated surface of the Si substrate 61 as opposed to on an insulation layer, and the metallized area is used as ground terminal 62.

Potential of the Si substrate 61 becomes a grounding level with the ground terminal 62.

As in PREVIOUS EXAMPLE 3, the single function surface-mounted module is arranged such that the Si substrate and the electrodes of an LD or a PD are electrically connected through capacitance. In this arrangement, the high resistivity Si substrate is in a state of an electrical floating potential and the Si substrate becomes a kind of antenna. When the module is used as a receiver, the Si substrate in floating potential connects with a PD. When the module is used as a transmitter, the Si substrate in floating potential connects with an LD.

As a receiver, these modules having the high resistivity Si substrate are too sensitive to external noise, and radiate the noise externally as a transmitter.

The highest resistivity Si substrate is normally limited to the degree of 10 Ωcm or 100 Ωcm, because Si has a narrow band gap even though it contains slight n-type or p-type impurities. It is impossible to increase the resistivity of an Si substrate to the range of the insulator. Since the high resistivity Si substrate is not mass-produced because it differs from that used in the semiconductor industry, the cost of the substrate is high.

On the other hand, in a module using a low resistivity Si substrate according to the present invention, providing a ground terminal on the uninsulated surface of the Si substrate reduces external noise. Specific effects by this EXAMPLE are described as follows.

The area of the Si substrate 61 is 15 mm×10 mm and thickness is 1 mm. The resistivity of the substrate is 0.1 Ωcm. The resistance between the electrode pattern 22 for an optical device mounted on the insulation layer and the ground terminal 62 is estimated below.

The distance between the ground terminal 62 and the electrode pattern 22 is assumed to be about 3 mm, and a half length (=5 mm) of the ground pattern 62 is assumed to contribute to the conduction. Substituting the above values with 1 mm thickness of the Si substrate to Equation (1), the resistance is calculated as follows:

$$R = 0.1\ \Omega cm \times 0.3\ cm / (0.1\ cm \times 0.5\ cm) = \text{approximately } 0.6\ \Omega.$$

Even with over-estimation, the resistance is only about 1 Ω. This resistance value is sufficiently lower than 50 Ω which is the characteristic impedance of usual high-speed electron circuits. In other words, the nearest Si substrate under an insulation layer for an optical device becomes a favorable ground. Thus, the present invention is characterized in having a constitution to exhibit an effect such that a noise current on the Si substrate 61 flows to the metallized ground terminal 62 provided on the uninsulated surface of the Si substrate, thereby preventing the noise sneaking round to the optical device 24. Otherwise, the noise on the Si substrate would cause a jam because it will travel to the optical device such as a PD and an LD or the electrode patterns 22 thereunder.

If the resistivity of the Si substrate is 100 Ωcm as shown in the PREVIOUS EXAMPLE, the resistance between the optical device and the ground terminal becomes 1 kΩ. This resistance is much higher than 50 Ω of the characteristic impedance of usual high-speed electron circuits. Therefore, even if the Si substrate is grounded by providing the ground terminal 62 on the surface of the Si substrate, the Si substrate does not become a strong ground. If the resistivity of Si is 1 Ωcm, resistance between the optical device and the ground terminal is estimated at about 10 Ω.

From the above examples, it has found that the reduction of the effect from external noise or reduction of external emission of noise can be achieved by adopting a low resistivity Si substrate and providing a ground terminal on the surface of the Si substrate near a PD or an LD of the single function surface-mounted module.

What is claimed is:

1. An optical communication apparatus comprising:
   a Si substrate having resistivity below 1 Ωcm and connected to a ground potential level;
   an insulation layer provided at least on a portion of the surface of the Si substrate;
   at least one optical device selected from the group of a laser diode and a photo diode, and mounted on the insulation layer; and
   at least one ground terminal on the same surface of the Si substrate as the insulating layer.

2. An optical communication apparatus comprising:
   a Si substrate having resistivity below 1 Ωcm and connected to a ground potential level;
   an insulation layer provided at least on a portion of the surface of the Si substrate;
   at least one optical device selected from the group of a laser diode and a photo diode, and mounted on the insulation layer;
   electrode patterns for optical devices on the insulation layer on the surface of the Si substrate; and
   a ground terminal on an uninsulated surface of the Si substrate and shaped like a comb-tooth among the electrode patterns.

3. An optical communication apparatus according to claim 2 wherein the resistivity of the Si substrate is 0.1 Ωcm or less.

4. An optical communication apparatus according to claim 2 further comprising an optical system including an optical wave-guide in a portion of the insulating layer.

5. An optical communication apparatus according to claim 2 further comprising a metallic grounding contact adhered to a bottom surface of the Si substrate.

6. An optical communication apparatus according to claim 2 comprising:
   a SiO2-based wave-guide formed on the Si substrate; and
   a laser diode comprising InGaAsP and a photo diode comprising InGaAsP mounted on the Si substrate;
   wherein the apparatus is arranged for transmitting and receiving optical signals having wavelengths from 1.3 $\mu$m to 1.55 $\mu$m.

7. An optical communication apparatus according to claim 6 wherein the resistivity of the Si substrate is 0.1 Ωcm or less.

8. An optical communication apparatus according to claim 7 comprising a metallic grounding contact adhered to a bottom surface of the Si substrate.

9. An optical communication apparatus according to claim 6 wherein the Si substrate has a thickness of from 1.0 mm to 1.5 mm.

10. An optical communication apparatus according to claim 9 comprising a metallic grounding contact adhered to a bottom surface of the Si substrate.

11. An optical communication apparatus according to claim 2 comprising a copper grounding contact adhered to a bottom surface of the Si substrate.

12. An apparatus comprising:
    a silicon substrate having a resistivity of less than 1 Ωcm and coupled to a ground potential level;
    an insulation layer on a portion of the surface of the silicon substrate;
    at least one optical device mounted on the insulation layer;
    at least one optical fiber positioned so that light can be transmitted between the at least one optical fiber and the at least one optical device;
    electrodes for the at least one optical device provided on the insulation layer;
    a ground terminal on an uninsulated surface of the silicon substrate extending among the electrodes; and
    a metallic grounding contact coupled to a surface of the silicon substrate.

13. The apparatus of claim 12 wherein the at least one optical device includes a laser diode and a photo diode.

14. The apparatus of claim 13 including a first optical fiber positioned to receive light from the laser diode and a second optical fiber positioned to transmit light to the photo diode.

15. The apparatus of claim 13 including
    a first optical wave-guide formed on the silicon substrate and positioned to receive light from the laser diode;
    a second wave-guide formed on the silicon substrate and positioned to guide light to the photo diode; and
    an optical coupler positioned to direct light from the first optical wave-guide to the at least one optical fiber and to direct light received from the at least one optical fiber to the photo diode.

16. The apparatus of claim 13 including an optical fiber positioned within a ferule that is positioned in a groove in the silicon substrate, wherein the optical fiber is aligned with the optical device.

17. An optical communication apparatus comprising:
    a Si substrate connected to a ground potential level;
    an insulation layer provided at least on a portion of the surface of the Si substrate;
    at least one optical device selected from the group of a laser diode and a photo diode, and mounted on the insulation layer;
    electrode patterns for optical devices on the insulation layer on the surface of the Si substrate; and
    a ground terminal on an uninsulated surface of the Si substrate and shaped like a comb-tooth among the electrode patterns.

* * * * *